(12) United States Patent
Yun

(10) Patent No.: US 8,266,418 B2
(45) Date of Patent: Sep. 11, 2012

(54) COMPUTER SYSTEM AND METHOD OF BOOTING THE SAME

(76) Inventor: Dong-Goo Yun, Seoul (KR)

( * ) Notice: Subject to any disclaimer, the term of this patent is extended or adjusted under 35 U.S.C. 154(b) by 705 days.

(21) Appl. No.: 12/375,827

(22) PCT Filed: Jul. 30, 2007

(86) PCT No.: PCT/KR2007/003649
§ 371 (c)(1),
(2), (4) Date: Jan. 30, 2009

(87) PCT Pub. No.: WO2008/016245
PCT Pub. Date: Feb. 7, 2008

(65) Prior Publication Data
US 2010/0005285 A1    Jan. 7, 2010

(30) Foreign Application Priority Data

Jul. 31, 2006   (KR) .................. 10-2006-0072407
Aug. 7, 2006    (KR) .................. 10-2006-0074184
Oct. 24, 2006   (KR) .................. 10-2006-0103644

(51) Int. Cl.
*G06F 9/00* (2006.01)
(52) U.S. Cl. ............................................. 713/1; 713/2
(58) Field of Classification Search .................. 713/1, 2
See application file for complete search history.

(56) References Cited

U.S. PATENT DOCUMENTS 6,226,740 B1 * 5/2001 Iga ..................................... 713/2
7,165,172 B1 * 1/2007 Hamilton et al. .................. 713/1
7,836,339 B2 * 11/2010 Leete et al. ...................... 714/22
7,979,687 B2 * 7/2011 Miyajima ......................... 713/1

(Continued)

FOREIGN PATENT DOCUMENTS

KR   10-2002-0068138   8/2002

(Continued)

OTHER PUBLICATIONS

International Search Report for PCT/KR2007/003649 dated Nov. 9, 2007.

(Continued)

*Primary Examiner* — Kim Huynh
*Assistant Examiner* — Zahid Choudhury
(74) *Attorney, Agent, or Firm* — Cantor Colburn LLP

(57) ABSTRACT

Provided are a computer system and a method of booting the same. The computer system includes: a first storage unit for storing a booting-related program including an operating system program and data, the stored program and data being retained even when a power voltage is not supplied; and a second storage unit for storing data, the data being lost when the power voltage is not supplied for a predetermined time or longer. The method includes: a first step of performing a booting operation using the booting-related program stored in the first storage unit and storing the booting-related program stored in the first storage unit in the second storage unit when the second storage unit is detected and the booting-related program is not stored in the second storage unit; a second step for performing a booting operation by executing the booting-related program stored in the second storage unit when the second storage unit is detected and the booting-related program is stored in the second storage unit; and a third step of backing up the booting-related program stored in the second storage unit to the first storage unit when a predefined backup condition is met.

36 Claims, 11 Drawing Sheets

U.S. PATENT DOCUMENTS

| | | | |
|---|---|---|---|
| 2001/0039612 A1* | 11/2001 | Lee | 713/2 |
| 2003/0172261 A1 | 9/2003 | Lee et al. | |
| 2004/0078700 A1 | 4/2004 | Jeong | |
| 2004/0190210 A1* | 9/2004 | Leete | 361/90 |
| 2007/0005883 A1* | 1/2007 | Trika | 711/113 |
| 2008/0195854 A1* | 8/2008 | Choi | 713/2 |
| 2009/0150660 A1* | 6/2009 | Yao et al. | 713/2 |
| 2011/0078432 A1* | 3/2011 | Wu | 713/2 |

FOREIGN PATENT DOCUMENTS

KR  10-2006-0011250  2/2006

OTHER PUBLICATIONS

Written Opinion for PCT/KR2007/003649 dated Nov. 9, 2007.
PCT International Preliminary Report on Patentability; International Application No. PCT/KR2007/003649; Date of Issuance of Report: Feb. 3, 2009.

* cited by examiner

[Fig. 1]
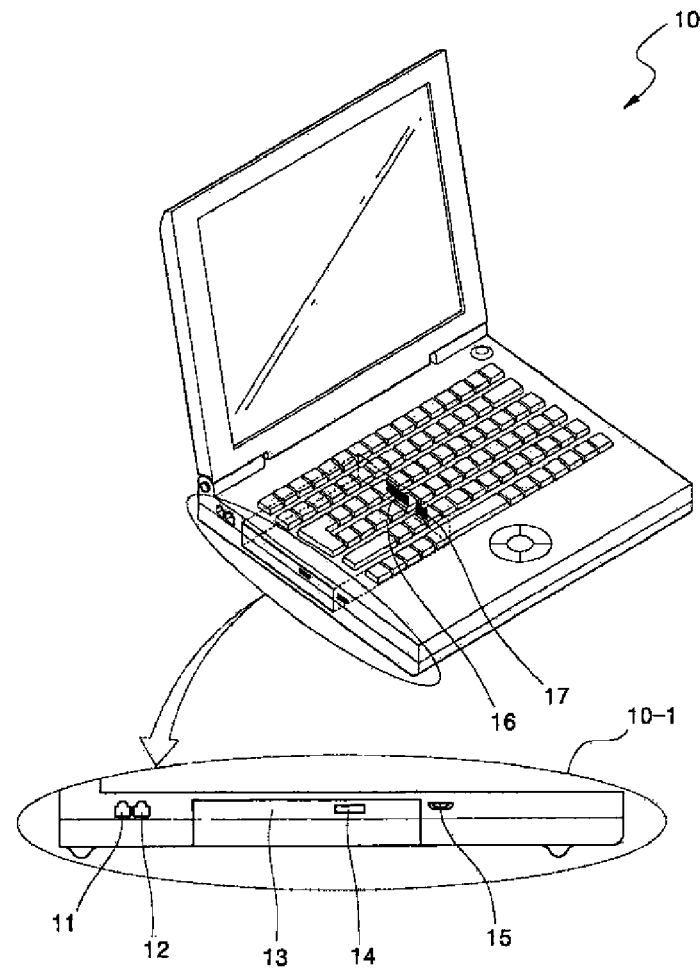
[Fig. 2]
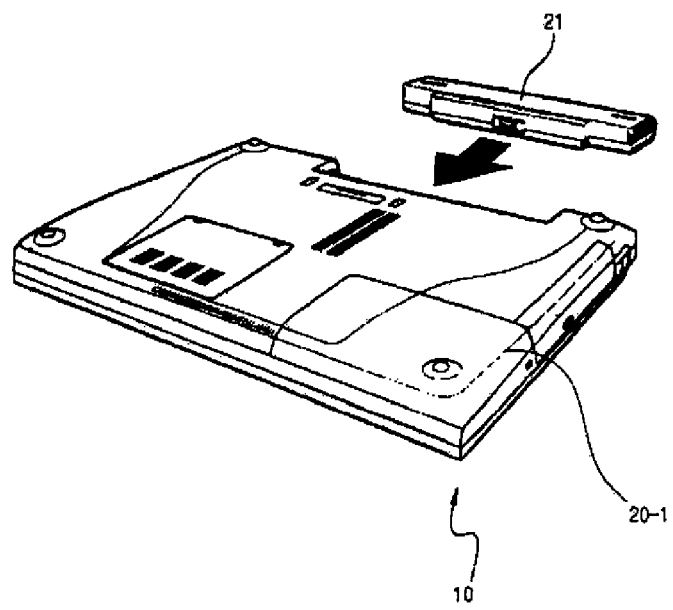

[Fig. 3]
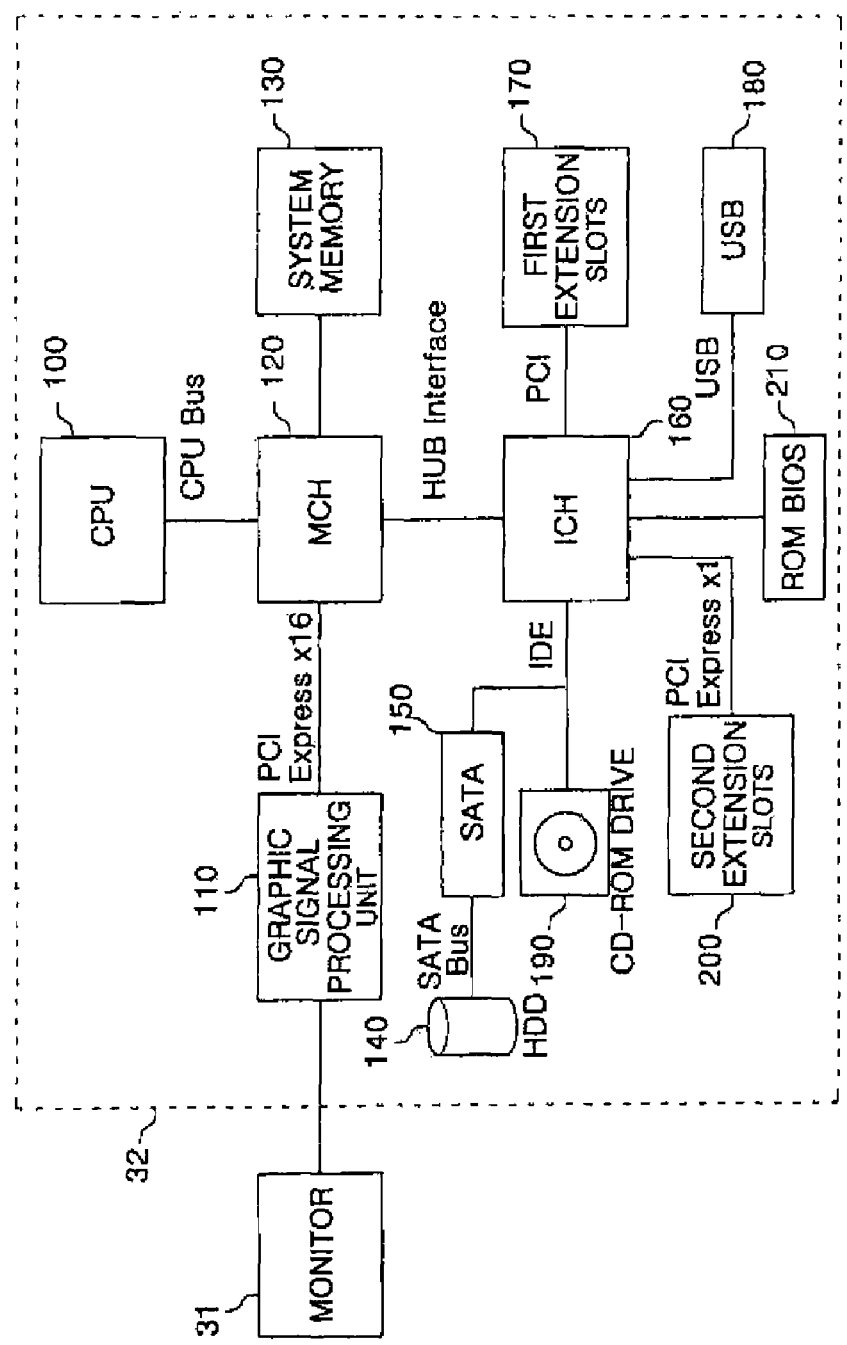

[Fig. 4]
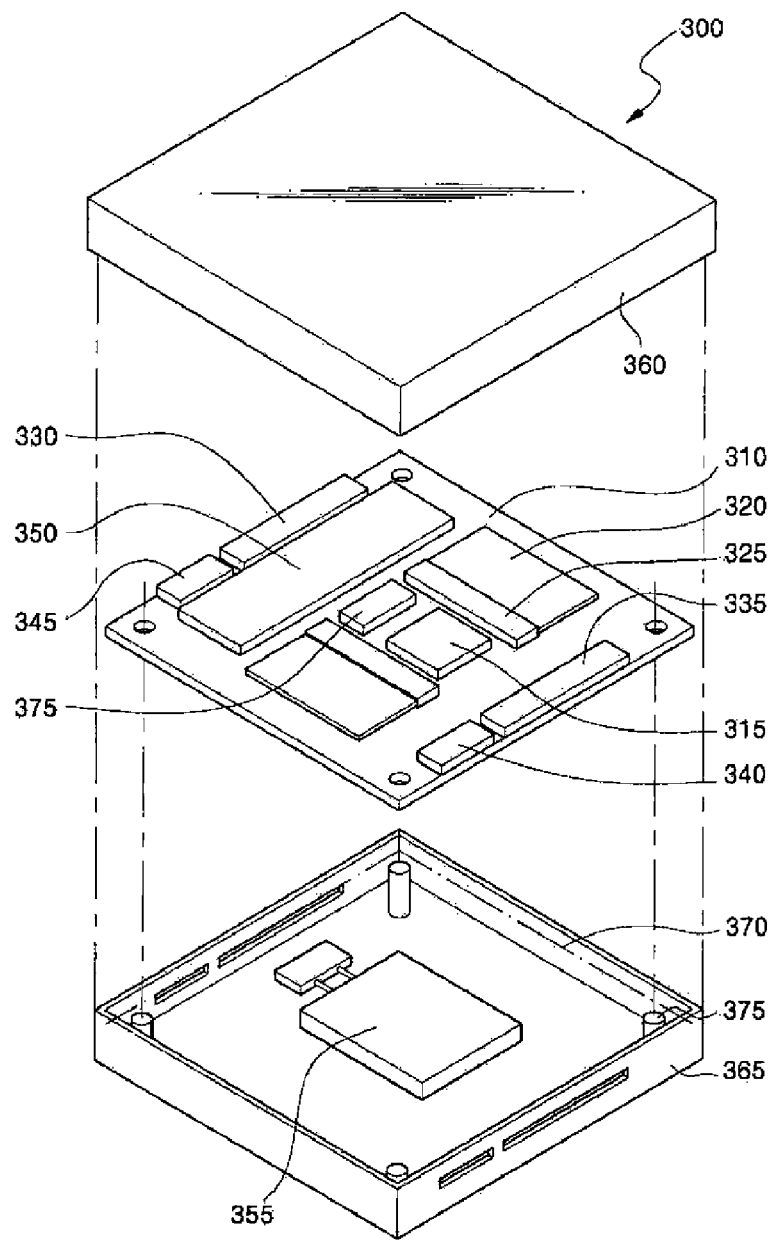
[Fig. 5]
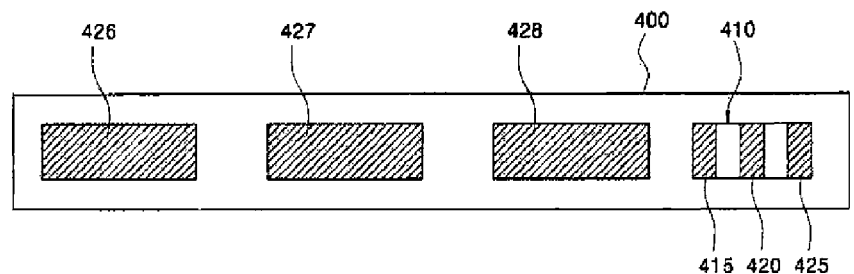

[Fig. 6]
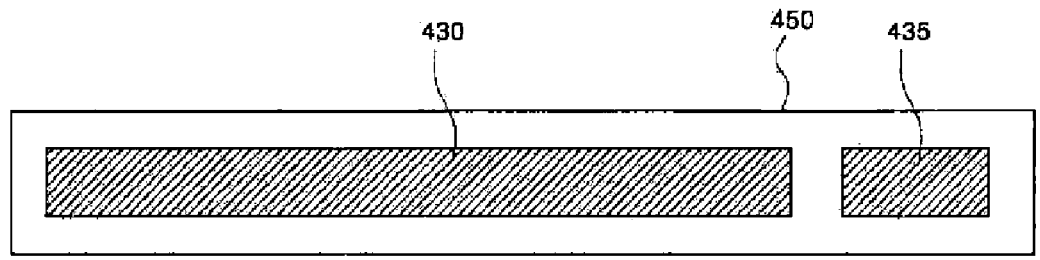
[Fig. 7]
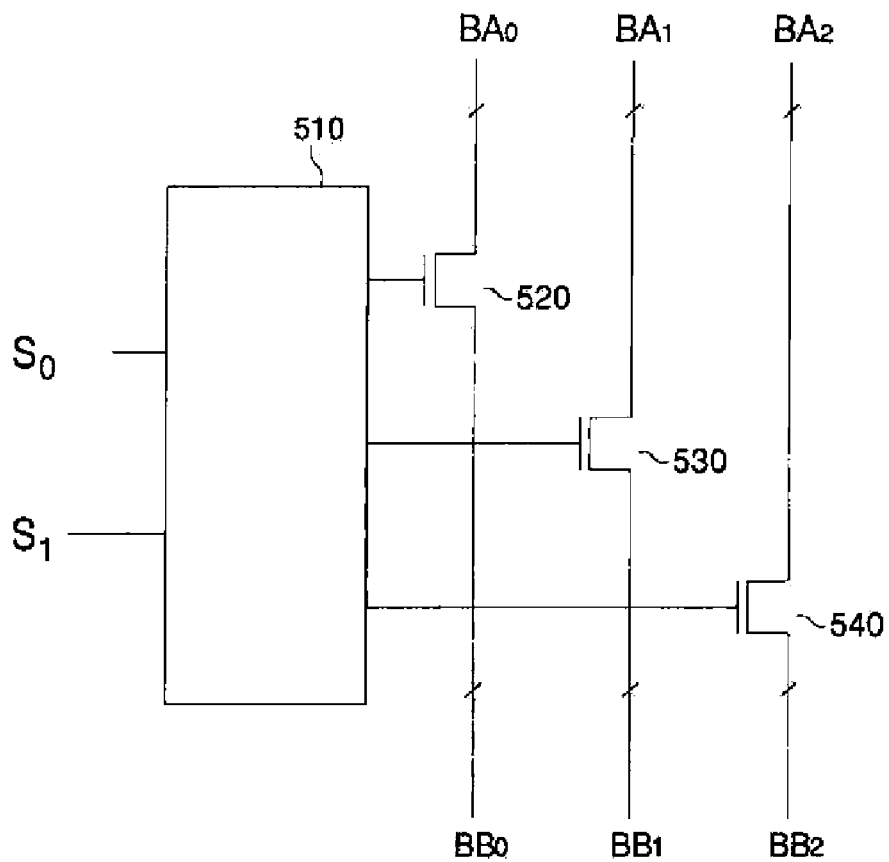

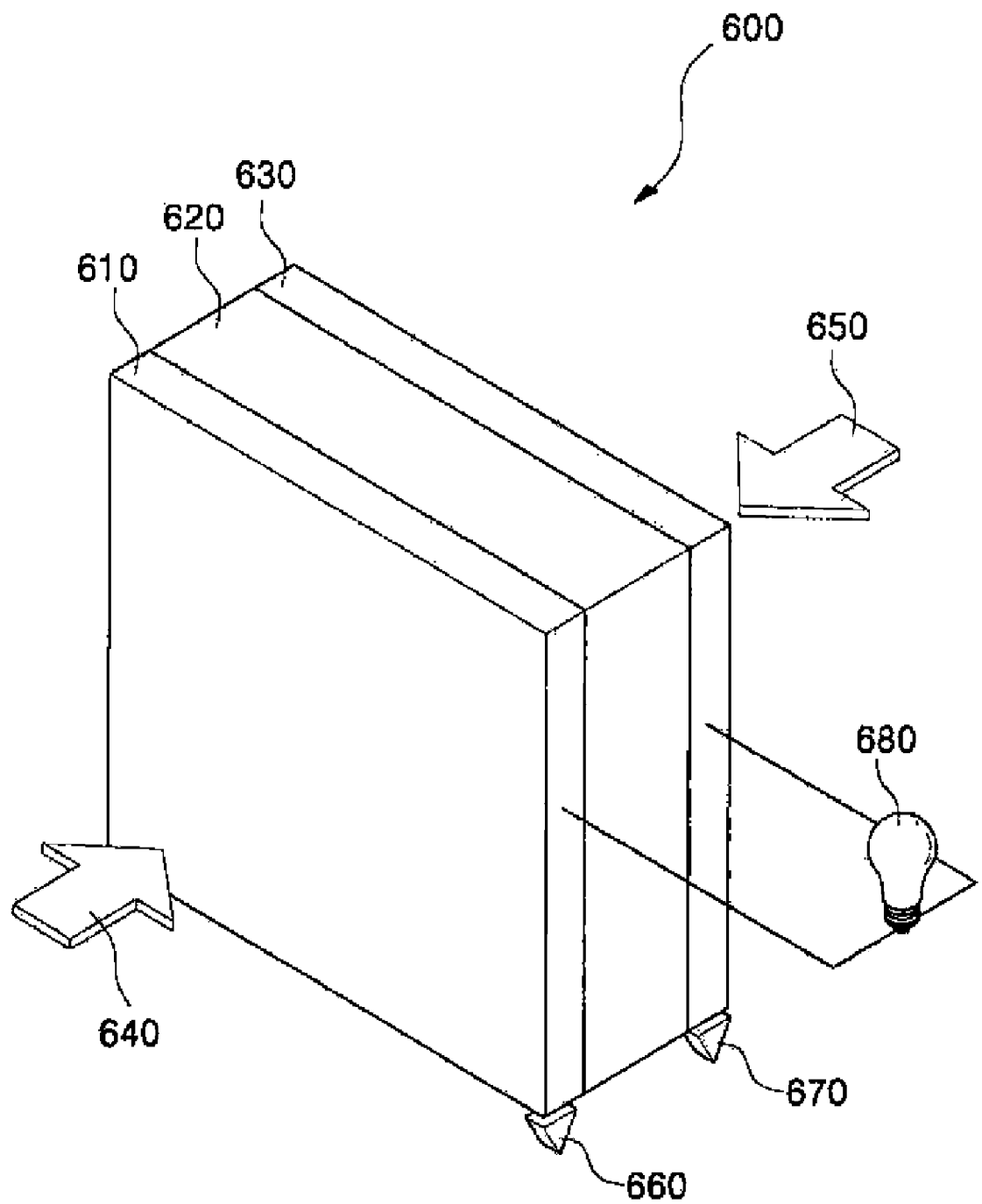
[Fig. 8]

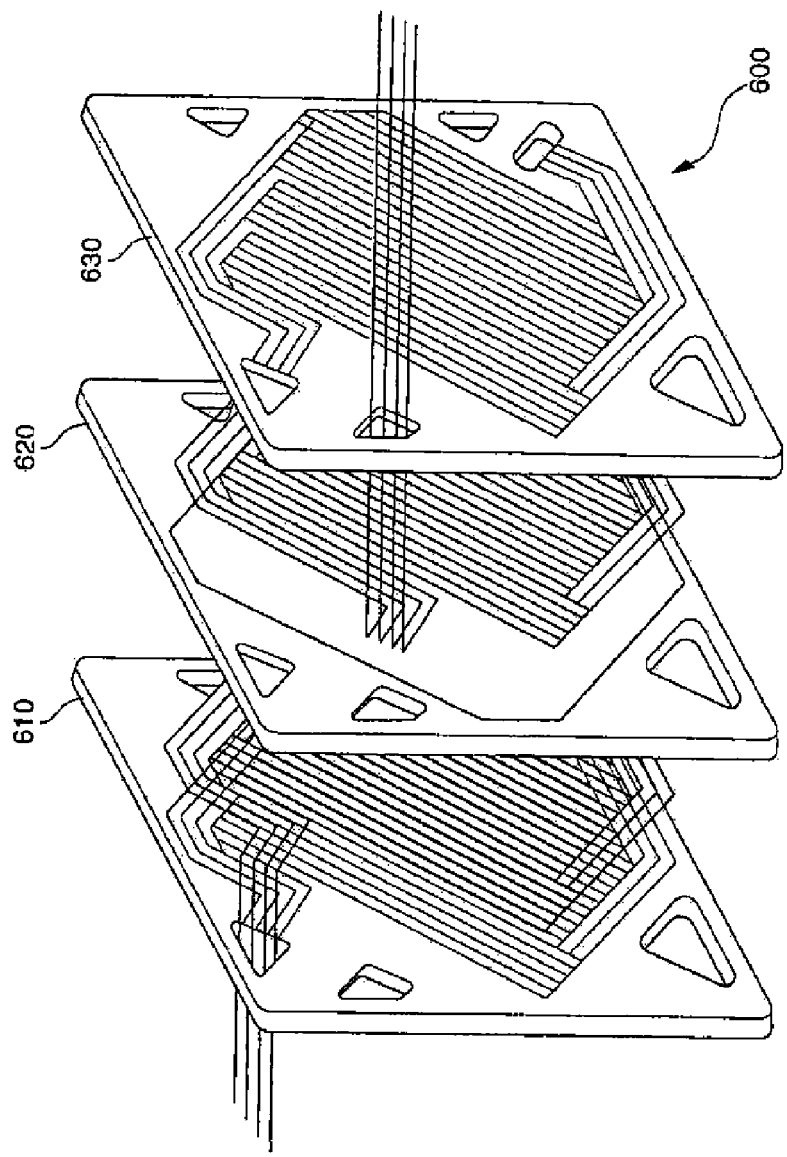
[Fig. 9]

[Fig. 10]
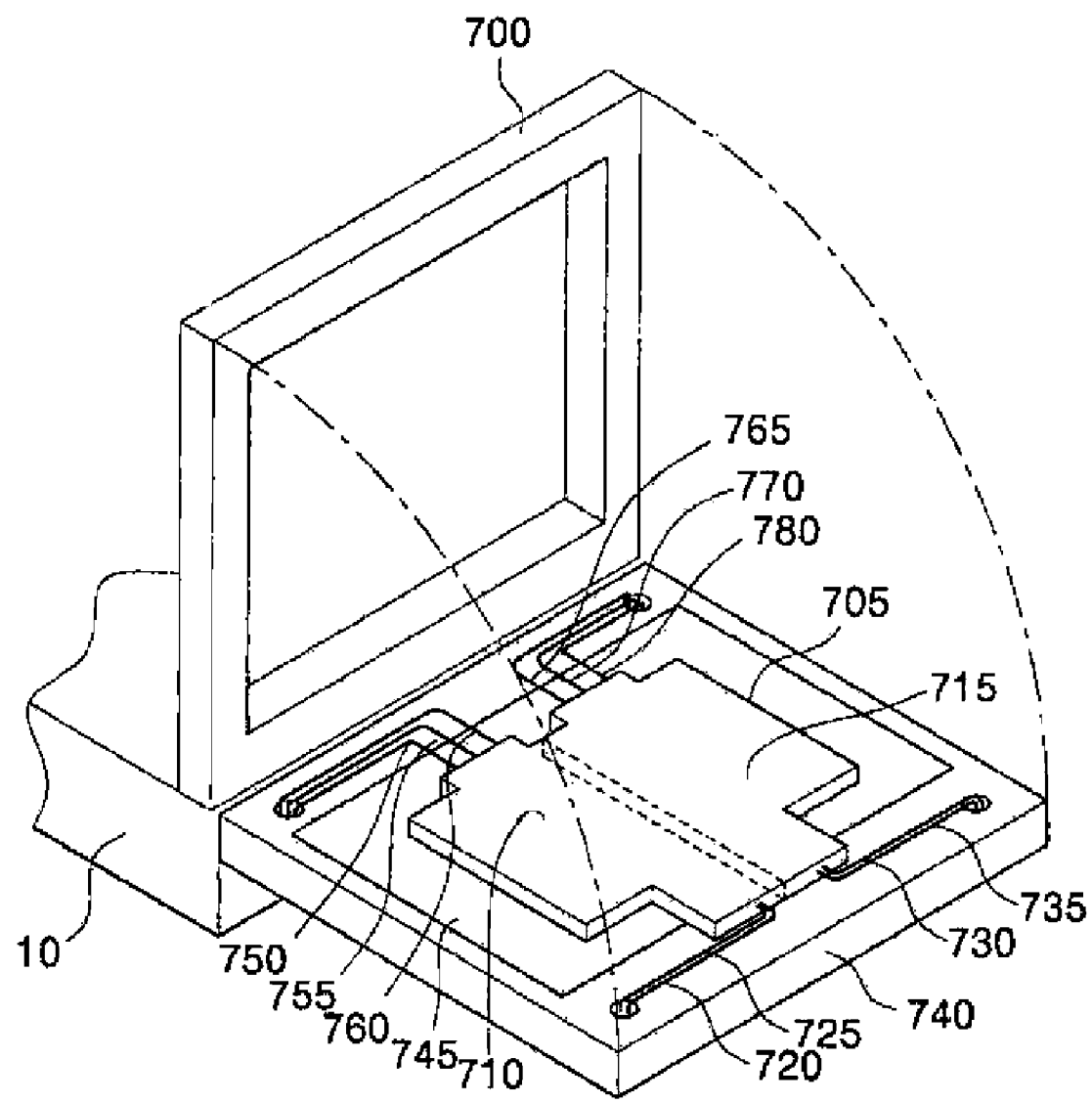

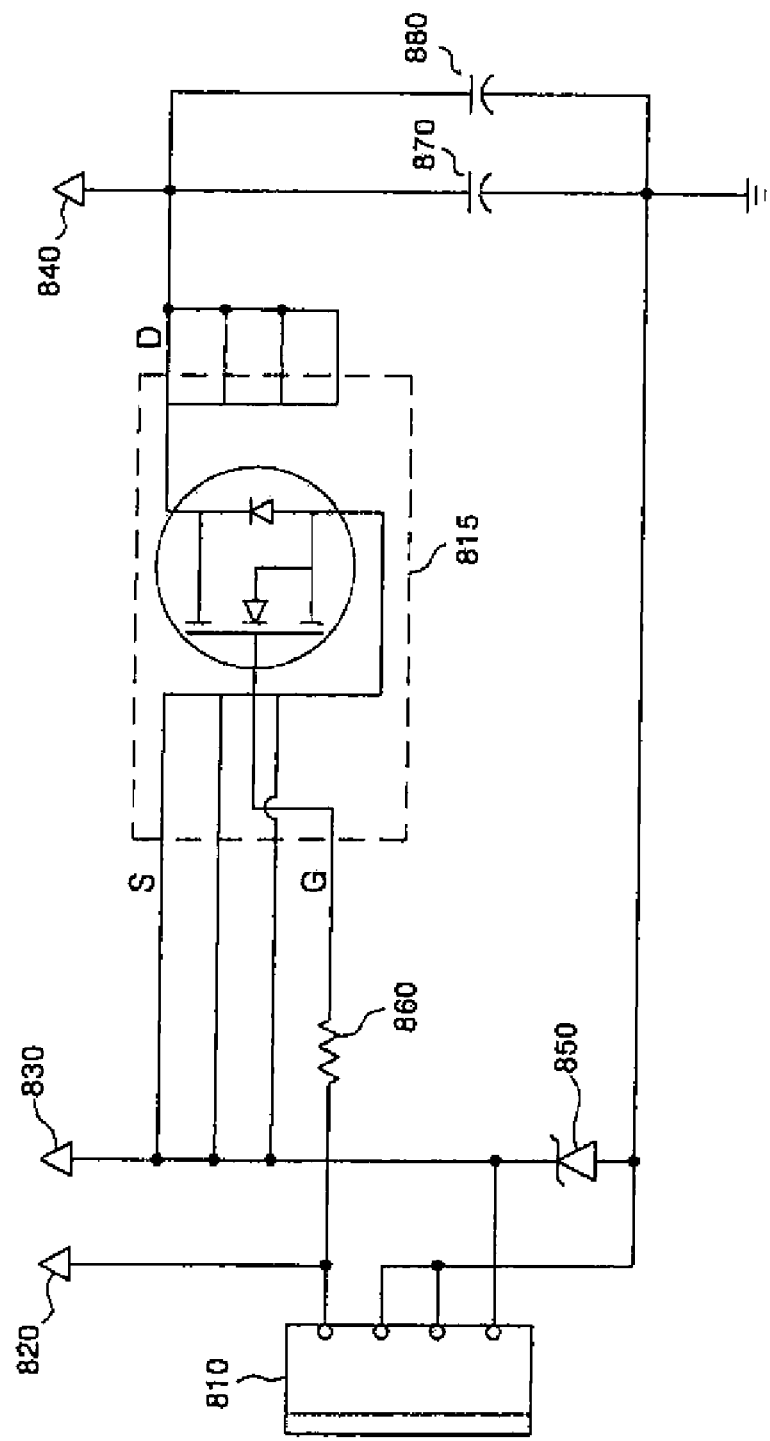

[Fig. 12]
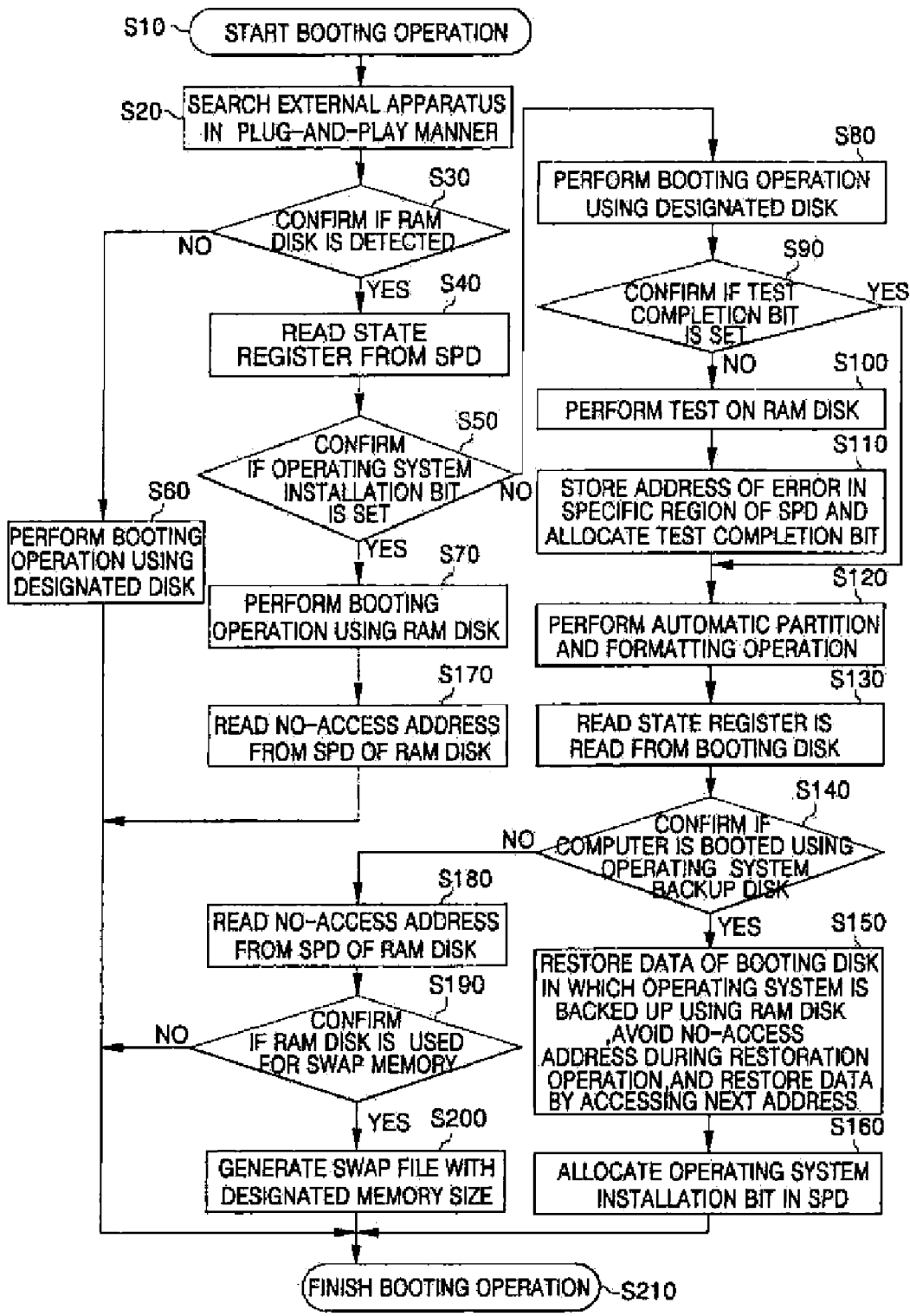

[Fig. 13]
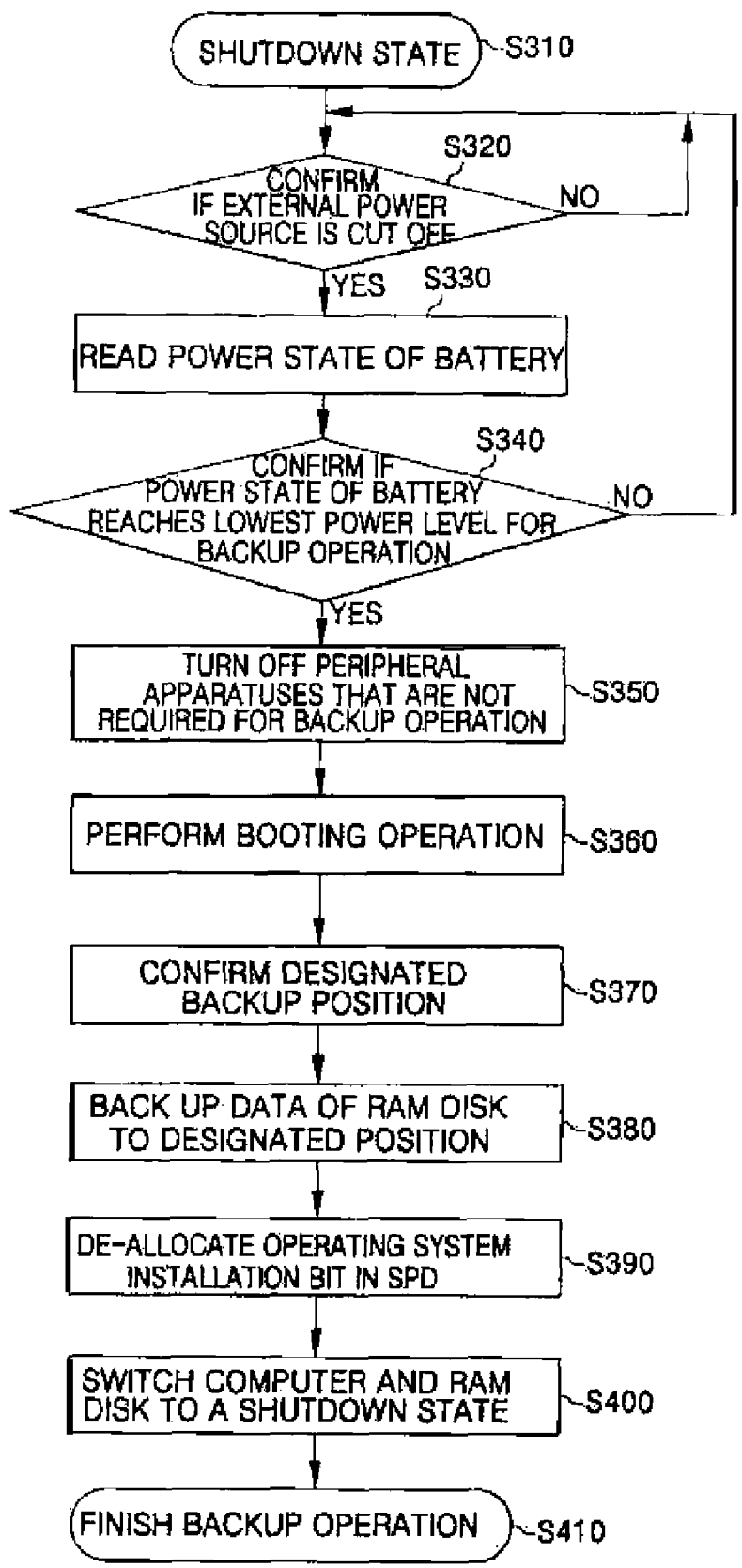

[Fig. 14]
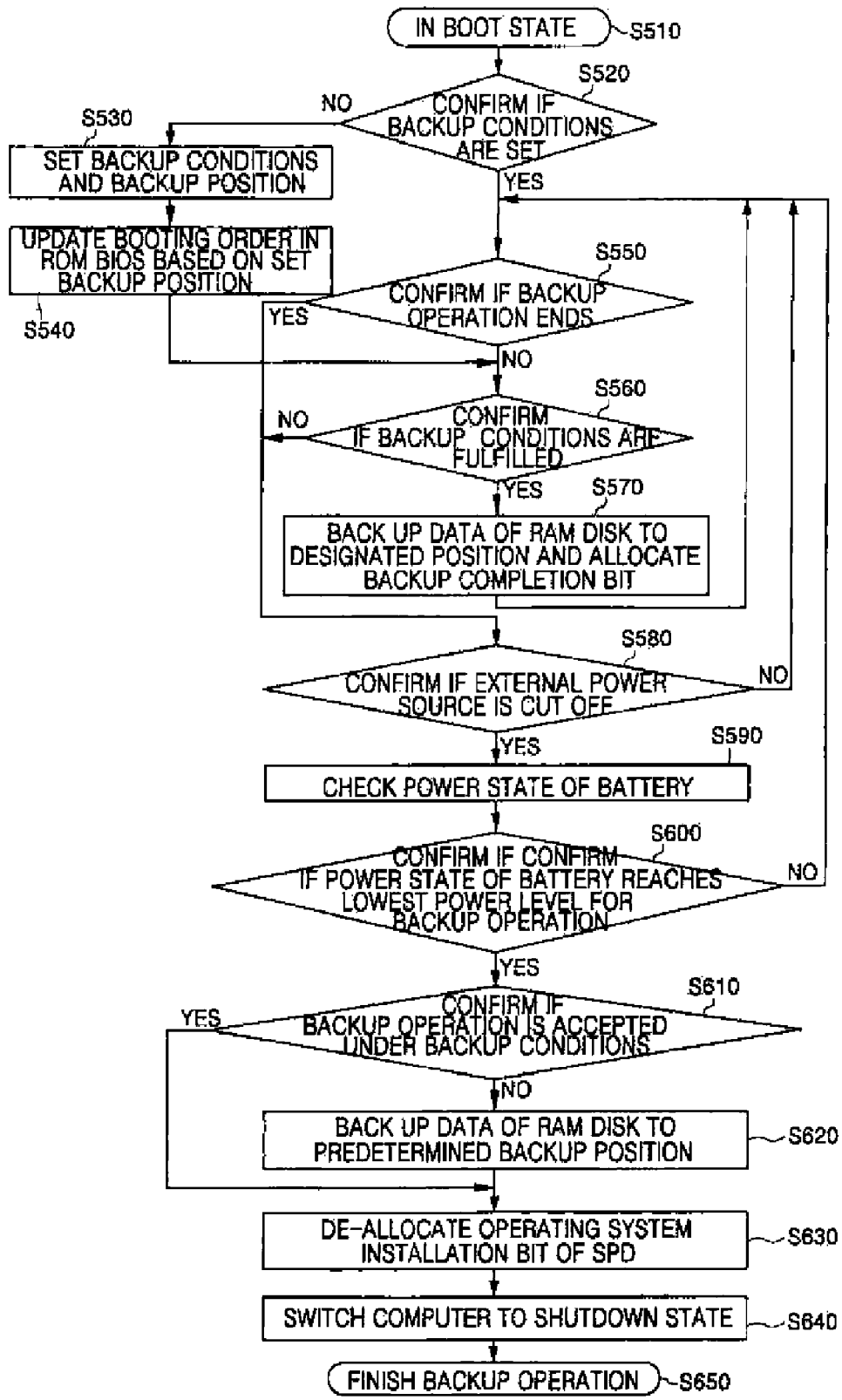

COMPUTER SYSTEM AND METHOD OF BOOTING THE SAME

TECHNICAL FIELD

The present invention relates to a computer system and a method of booting the same.

BACKGROUND ART

A conventional computer system stores a booting-related program including an operating system program in a storage device, such as a hard disk, and performs a booting operation using the booting-related program stored in the hard disk. However, since a conventional hard disk includes apparatuses, such as a motor, the hard disk may not be sufficiently durable after long-term use. Also, a lot of batteries may be consumed to operate the included apparatuses, and the hard disk operates at low speed, may be heavyweight, and may generate much heat and noise because of the apparatuses including the motor. In addition, the hard disk may be vulnerable to shocks so that it may be highly likely to have errors. Furthermore, it may take a long time to perform routine booting and shutdown operations using the hard disk.

Thus, a new storage medium is required to perform booting and shutdown operations at higher speed than the operating speed of the conventional hard disk.

However, in the case of a conventional notebook computer, there may not be sufficient space for mounting the new storage medium, while an infrequently used compact disc read-only memory (CD-ROM) drive is integrally formed with a main body of the notebook computer.

FIG. 1 illustrates a schematic lateral structure of a conventional notebook computer, and FIG. 2 illustrates a rear structure of the conventional notebook computer.

Referring to FIG. 1, a lateral portion 10-1 of a notebook computer 10 includes a modem port 11, a network (Ethernet) port 12, a CD-ROM drive 13, a drive ejection button 14, a security slot 15, a CD-ROM integrated device electronics (IDE) or serial advanced technology attachment (SATA) connector 16, and a power pin 17. Referring to FIG. 2, a rear portion 20-1 of the notebook computer 10 includes a battery 21.

Referring to FIGS. 1 and 2, unlike a desk-top computer, it may be difficult to upgrade the performance of a graphic card, additionally install a hard disk or a subsidiary battery, or integrally add an external apparatus to a main body of the notebook computer 10 after a user purchases the notebook computer 10.

Of course, it may be possible to connect/add an external apparatus to the main body of the notebook computer 10 using a universal serial bus (USB) port or a peripheral component interconnection (PCI) express bus port, which may be provided as an external connection port of a main body of a notebook computer. However, the operating performance of the notebook computer 10 may be limited due to the fact that an external bus has poorer performance than an internal bus of the notebook computer 10. Moreover, when the external apparatus is connected to the main body of the notebook computer 10, carrying the notebook computer 10 as a portable device becomes inconvenient.

DISCLOSURE

Technical Problem

The present invention is directed to a computer system, which is booted at high speed and automatically backs up or restores booting-related programs including an operating system program.

The present invention is also directed to a computer system, which includes a storage device including a dynamic memory unit, and is booted at high speed and automatically backs up or restores the booting-related programs including an operating system program.

Further, the present invention is directed to a computer system on which an external apparatus can be easily mounted.

In addition, the present invention is directed to an improved method of sorting a memory device during a semiconductor test process required for fabricating a memory constituting a RAM disk included in a device bay. In this method, a conventionally discarded semi-defective memory device can be recycled using an improved semiconductor test process, so that low-priced RAM disks can be produced and yield can be increased.

Technical Solution

One aspect of the present invention provides a computer system including: a first storage unit for storing a booting-related program including an operating system program and data, the stored program and data being retained even when a power voltage is not supplied; a second storage unit for storing data, the data being lost when the power voltage is not supplied; and a controller for performing a booting operation using the booting-related program stored in the first storage unit when the second storage unit is detected and the booting-related program is not stored in the second storage unit, storing the booting-related program stored in the first storage unit in the second storage unit, running the booting-related program stored in the second storage unit to perform a subsequent booting operation, and backing up the booting-related program stored in the second storage unit to the first storage unit when a predefined backup condition is met.

Another aspect of the present invention provides a method of booting a computer system including: a first storage unit for storing a booting-related program including an operating system program and data, the stored program and data being retained even when a power voltage is not supplied; and a second storage unit for storing data, the data being lost when the power voltage is not supplied for a predetermined time or longer. The method includes: a first step of performing a booting operation using the booting-related program stored in the first storage unit and storing the booting-related program stored in the first storage unit in the second storage unit when the second storage unit is detected and the booting-related program is not stored in the second storage unit; a second step for performing a booting operation by executing the booting-related program stored in the second storage unit when the second storage unit is detected and the booting-related program is stored in the second storage unit; and a third step of backing up the booting-related program stored in the second storage unit to the first storage unit when a predefined backup condition is met.

Yet another aspect of the present invention provides a computer system including a connector connected to an integrated device electronics (IDE) bus, a serial advanced technology attachment (SATA) bus, or a peripheral component interconnection (PCI) express bus located inside a space where an external apparatus is mounted, wherein the external apparatus is connected to one of the IDE bus, the SATA bus, and the PCI express bus through the connector.

Further another aspect of the present invention provides a method of sorting a dynamic memory device for an external storage device. The method includes: performing a test on all addresses of the dynamic memory device; judging the dynamic memory device to be a semi-defective memory device sorted along with a non-defective memory device when a predetermined number of addresses are defective, and judging the dynamic memory device to be a defective memory device when more than the predetermined number of addresses are defective; and using the semi-defective memory device as a memory device for the external storage device, instead of discarding the semi-defective memory device.

Advantageous Effects

As described above, a computer system according to the present invention includes a device bay, which expands connection of a conventional computer system with an external apparatus, and a RAM disk, which includes memories that are produced using an improved semiconductor process. By adopting the improved semiconductor process, the efficiency of a semiconductor fabrication process can be elevated and a low-priced RAM disk can be produced. Also, the present invention provides an additional method of connecting an external apparatus to a notebook computer, and the notebook computer according to the present invention can include an improved power source and have an excellent heat radiation characteristic compared with a conventional notebook computer.

Furthermore, the RAM disk mounted in the device bay provides backup, restoration, and booting operations for stably managing stored data. Thus, a loss in an operating system stored in a RAM disk that enables the computer to perform a fast booting operation can be prevented irrespective of the interruption of an external power source connected to the RAM disk.

DESCRIPTION OF DRAWINGS

FIG. 1 illustrates a schematic lateral structure of a conventional notebook computer;

FIG. 2 illustrates a rear structure of the conventional notebook computer;

FIG. 3 is a block diagram of a conventional notebook computer;

FIG. 4 is an exploded view of a device bay according to an exemplary embodiment of the present invention;

FIG. 5 illustrates a connector added to a notebook computer according to an exemplary embodiment of the present invention;

FIG. 6 illustrates a connector added to a notebook computer according to another exemplary embodiment of the present invention;

FIG. 7 is a circuit diagram of an example of a switch used for connection of a device bay according to an exemplary embodiment of the present invention;

FIG. 8 is a perspective view illustrating the operating principle of a power source according to an exemplary embodiment of the present invention;

FIG. 9 is an exploded view of an internal structure of the power source shown in FIG. 8;

FIG. 10 illustrates a method of connecting a power source to a notebook computer according to an exemplary embodiment of the present invention;

FIG. 11 is a circuit diagram showing a circuit including a power interruption device for controlling the power supply of a device bay according to an exemplary embodiment of the present invention;

FIG. 12 is a flowchart illustrating a booting operation using a RAM disk included in a device bay according to an exemplary embodiment of the present invention;

FIG. 13 is a flowchart illustrating a backup operation of a RAM disk according to an exemplary embodiment of the present invention; and FIG. 14 is a flowchart illustrating a backup operation of a RAM device according to another exemplary embodiment of the present invention.

MODE FOR INVENTION

Hereinafter, a computer system including a device bay and methods of backing up and booting the same according to exemplary embodiments of the present invention will be described in detail. The same reference numerals are used to denote the same elements throughout the specification.

FIG. 3 is a block diagram of a conventional computer system. Referring to FIG. 3, the computer system includes a monitor 31 and a main body 32. The main body 32 includes a central processing unit (CPU) 100, a graphic signal processing unit 110, a memory controller hub (MCH) 120, a system memory 130, a hard disk 140, an input/output (I/O) controller hub (ICH) 160, first extension slots 170, a read-only memory (ROM) basic input/output system (BIOS) or BIOS memory 210, second extension slots 200, a serial advanced technology attachment (SATA) bus, a peripheral component interconnection (PCI) express bus, an integrated device electronics (IDE) bus, and a universal serial bus (USB).

Constructions of the respective blocks of the main body 32 shown in FIG. 3 will be described.

The CPU 100 executes an application program and performs a general control operation. The graphic signal processing unit 110 processes a graphic signal transmitted from the system memory 130 and displays the processed signal on the monitor 31.

The MCH 120 includes a host interface connected to the CPU 100, a memory interface connected to the system memory 130, and a PCI express interface connected to the PCI express x16 bus to control the graphic signal processing unit 110. Thus, the MCH 120 enables the CPU 100, the system memory 130, and the graphic signal processing unit 110 to interface with one another.

The system memory 130 functions as a storage unit that stores an application program being executed now and data being used now, so that the CPU 100 can operate at higher speed.

A variety of application programs and data are stored in the hard disk 140.

The SATA 150 enables the ICH 160 to interface with the hard disk 140. The USB is a kind of serial port, which is a plug-and-play interface used between the computer system and peripheral devices, such as an audio player, a joystick, a keyboard, a telephone, a scanner, and a printer.

The ICH 160 controls the supply of power to peripheral devices, such as the first and second extension slots 170 and 200, the SATA 150, and the USB, and the flow of data at the same time and enables the first and second extension slots 170 and 200, the SATA 150, and the USB to interface with the MCH 120.

The first extension slots 170, which are PCI slots, are mounted on PCI devices, such as a LAN card and a sound card, and connected to a PCI bus to transmit and receive data. The second extension slots 200 are PCI express x1 slots. Each of the second extension slots 200 is a higher version based on a high-speed serial interface extended from the first extension slot 170 and supports faster data transmission and reception.

The ROM BIOS 210 stores various kinds of setting values and basic commands required for operating basic hardware of the computer, such as an input device, an output device, and a memory, in a non-volatile memory such as flash ROM or flash memory.

FIG. 4 is an exploded view of a device bay according to an exemplary embodiment of the present invention.

Referring to FIG. 4, a device bay 300 includes a memory card 310, a controller 315, a SODIMM (small outline double in-line memory) module 320, a SODIMM socket 325, a serial presence detect (SPD) 375 including an electrically erasable and programmable read only memory (EEPROM), and an internal connector. The internal connector includes an extension connector 330, a data connector 335, a first power connector 340, and a second power connector 345. The device bay 300 further includes an upper battery 350, a lower battery 355, an upper cover 360, a lower cover 365, an upper/lower-cover boundary line 370, and a stand 380.

The device bay 300 is installed instead of a CD-ROM drive 13 (refer to FIG. 1) on the left or right side of a main body of a notebook computer. The data connector 335 is connected to a portion used for interfacing with an external apparatus, such as the conventional IDE connector or SATA connector 16 of the notebook computer, so that the device bay 300 can be electrically connected to the external apparatus. Alternatively, the data connector 335 enables the notebook computer to transmit and receive signals to and from an external apparatus connected through the extension connector 330 of the device bay device 300.

Actual external apparatuses are interfaced with one another using a specific bus protocol according to purpose. For example, a portable hard disk transmits and receives data to and from a CPU (not shown) and other functional blocks (not shown) in a SATA manner in contrast to an internal bus (not shown) located in a main board (not shown) of the notebook computer.

Thus, an apparatus that enables the notebook computer to support specific bus protocol should be added to the notebook computer in order to connect the notebook computer with a plurality of external apparatuses. An exemplary connector 400 added to a notebook computer is illustrated in FIG. 5. Referring to FIG. 5, in order to support specific bus protocol of one of a plurality of external apparatuses, which is actually connected to the notebook computer, not only an IDE connector 427 used for a CD-ROM drive but also a SATA connector 426 and a PCI express connector 428 are added to the notebook computer, and protocol information of the actually connected external apparatus is transmitted through a connector sensor 410 to a main board (not shown). That is, when the external apparatus is connected to the connector sensor 410 and the IDE connector 427, a specific value of the connector sensor 410 is input to the main board through a jumper (not shown) connected to an IDE connector connection checker 420 of the connector sensor 410. A PCI express connector connection checker 425 and a SATA connector connection checker 415 correspond to respective bus interface protocols and inform the main board of the corresponding specific values. Each of the IDE connector 427, the SATA connector 426, and the PCI express connector 428 is directly connected to a bus for supporting the corresponding bus protocol, refers to bus protocol information input from the connector sensor 410, and enables the corresponding apparatus to perform proper operations.

Also, when the PCI express connector 428 and a power connector (not shown) for the PCI express connector 428 are additionally included in the notebook computer, power for charging is supplied to the upper and lower batteries 350 and 355 through the first power connector 340 of the device bay 300.

Another exemplary connector 450 added to the notebook computer to connect the notebook computer with a plurality of external apparatuses is illustrated in FIG. 6.

Referring to FIG. 6, a conventional IDE connector is replaced by a PCI express x16 connector 420, which is capable of supporting the highest transmission rate and accommodating a large number of input/output (I/O) pins for IDE or SATA, and an additional switch is added on a main board (not shown) to support the connection of the main board with the corresponding bus. In this case, the kind of external apparatus added in a plug-and-play manner provided by an operating system of the notebook computer is recognized using software according to the kind of the external apparatus so that the additional switch may be omitted.

The purpose of the PCI express x16 connector 430 is to enable the notebook computer to interface with an external apparatus using only one connector and utilize a conventional notebook computer to the utmost. Therefore, an apparatus for connecting the external apparatus to an internal bus of the notebook computer corresponding to specific bus protocol of the external apparatus is required.

An example of a switch that recognizes bus protocol of an external apparatus, classifies signal transmission paths, and transmits signals when using the PCI express x16 connector 430 is illustrated in FIG. 7. The switch shown in FIG. 7 is installed between the PCI express x16 connector 430 and a bus (not shown) located on the main board and supports the connection of the external apparatus with an internal bus (not shown) of the notebook computer.

When a graphic card is mounted on a device bay, an output of the graphic card connected to a monitor is connected to a graphic output terminal located on a motherboard through a graphic card output port 435. In general, when a graphic card is mounted on a device bay, it is enabled instead of an on-board video graphics array (VGA) located on the motherboard. In this case, an output of the actually enabled graphic card is connected to an internal bus through a MUX switch shown in FIG. 7.

When an external graphic card supports a digital video interactive (DVI) format or high definition multimedia interface (HDMI) format, an additional output port (not shown) may be disposed on an exposed surface of the device bay 300 in addition to a conventional analog graphic output terminal disposed on the motherboard.

FIG. 7 illustrates an example of a switch. One of input bus signals BB0, BB1, and BB2 is transmitted to one of a SATA bus BA0, an IDE bus BA1, and a PCI express bus BA2 by a selector 510 that operates in response to a combination of control signals S0 and S1 input from the PCI express x16 connector 430 as shown in Table 1. In Table 1, reference character "H" denotes a high-level voltage, and "L" denotes a low-level voltage.

TABLE 1

| Selection | | |
|---|---|---|
| $S_1$ | $S_2$ | Connection |
| L | L | BA0-BB0 |
| L | H | BA1-BB1 |
| H | L | BA2-BB2 |
| H | H | Hi-Z |

As described above, the device bay 300 according to the exemplary embodiment of the present invention may be installed in a location of a CD-ROM drive of a conventional notebook computer. More device bays need to be provided to the notebook computer so as to additionally install external apparatuses having various functions to meet a user's demand. However, since the conventional notebook computer includes a variety of internal apparatuses in a small case body to ensure portability, there is a specific limit to increasing the number of connection ports of apparatuses formed integrally with a main body. Therefore, a method for making good use of an external apparatus by improving the internal structure of the conventional notebook computer is as follows.

Referring again to FIG. 1, the battery 21, which is a conventional power source, is located behind the rear portion 20-1 of the notebook computer. When the battery 21 is transferred to a space between an LCD panel and a top cover, a fuel cell, a paper cell, or a lithium/lithium polymer cell can be used to substitute for a conventional battery according to purpose.

FIG. 8 is a perspective view illustrating the operating principle of a power source according to an exemplary embodiment of the present invention.

Referring to FIG. 8, a cell 600, which is a basic element of a fuel cell, causes an electrochemical reaction between hydrogen contained in fuel and oxygen contained in air, thereby directly generating electricity. That is, hydrogen supplied to a fuel pole (anode) 610 is divided into hydrogen ions and electrons.

The hydrogen ions produced in the anode 610 are transferred to an air pole (cathode) 630 through an electrolytic layer 620. A reaction between oxygen ions and the hydrogen ions occurs in the cathode 630 to generate water. In this case, the electrons are transferred to the cathode 630 through an external circuit to generate electricity.

Thus, when hydrogen 640 and oxygen 650 are finally supplied from liquid fuel, a predetermined electrical device 680 can operate due to the electricity generated by the chemical reaction, and water and heat are exhausted through outlets 660 and 670.

FIG. 9 is an exploded view of an internal structure of the power source shown in FIG. 8.

The cell 600, which is the basic element of the fuel cell, includes the electrolytic layer 620 interposed between the anode 610 and the cathode 630. Since a single cell generates a very small amount of electricity, the cells 600 are connected in a stacked structure. Thus, the fuel cell generates a large amount of electric energy using a stack of the cells 600, and the stack of the cells 600 is formed to a great width and a small thickness so that the stack of the cells 600 can be located between the LCD panel and the top cover.

FIG. 10 illustrates a method of connecting a power source to a notebook computer according to an exemplary embodiment of the present invention.

A plastic container 705, which is a container for preserving liquid fuel, is used to prevent the leakage of the liquid fuel and efficiently use a space when injecting fuel to a fuel cell or consuming the fuel. Referring to FIG. 10, a plastic container 705 includes a liquid fuel storage 710, a water storage 715 for storing water generated when a fuel cell operates, a liquid fuel exhaust pipe 750, fuel circulation pipes 755 and 760, a water suction pipe 765, water circulation pipes 770 and 780, a fuel injection pipe 720, a water injection pipe 735, and air exhaust pipes 725 and 730. An additional plastic container (not shown) may be used as the water storage 715. Also, in order to cool down and store hot water generated during the drive of the fuel cell, the generated hot water is transferred from the water suction pipe 765 to the water storage 715 through a cooling pin (not shown) prepared on an outer lateral surface of a top cover 740.

A stack-type fuel cell (not shown) disposed under a conventional notebook computer is connected to the plastic container 705 through the fuel exhaust pipe 750, the water suction pipe 765, and an additional space (not shown) prepared under the notebook computer.

The plastic container 705 is installed in a space between an LCD panel 700 and the top cover 740. An inner lateral surface 745 of the top cover 740 with which the plastic container 705 used for mounting the fuel cell is in contact is processed using an adhesive tape so that the plastic container 705 can be strongly adhered to the inner lateral surface 745 of the top cover 740.

The liquid fuel stored in the liquid fuel storage 710 and the water generated during the operation of the fuel cell are stored through the water suction pipe 765 in a predetermined space of the plastic container 705, transferred to a water-cooled heat sink (not shown) through the fuel circulation pipes 755 and 760 and the water circulation pipes 770 and 780, respectively, and then transferred into the notebook computer, so that the liquid fuel and the water can be used to cool down principal heating components, such as a CPU of a main body of a computer or a controller of a graphic card. Also, water prepared in the water storage 715 in advance can be used for the same purpose.

As described above, a large-area top cover of an LCD monitor may function as a radiating plate, liquid fuel and water generated during operation of a fuel cell may be utilized using a heat sink having a hose in place of a cooling fan (not shown) of a notebook computer.

In addition to the fuel cell, a top cover of the LCD monitor can be fabricated to a smaller thickness using a thin lithium/lithium polymer cell to make good use of a space for a paper cell and the top cover. Also, a fuel cell, a paper cell, a lithium cell, and a lithium polymer cell can be installed in an inner space of the top cover. Also, the above-described cells may be capable of being attached to and detached from the notebook computer if necessary. Thus, the fuel cell is installed when inner power supply is required for a long time, the paper cell is installed when carrying the notebook computer, and the lithium/lithium polymer cell is installed in normal cases.

As described above, when a battery is transferred from a rear surface of a main body of a conventional notebook computer to the inner lateral surface of the top cover of the LCD monitor, a space for a device bay can be ensured in addition to a CD-ROM drive located on the lateral surface of the main body of the conventional notebook computer, so that a main board can be designed to expand toward the rear surface of the main body.

Also, by removing a thick battery pack from the rear surface of the main body, air-flow in the main body to cool down heating components is allowed to directly flow from a front surface portion of the main body to a rear surface portion thereof. As a result, since the air can linearly flow to the rear surface portion that is wider than a lateral surface portion of the main body, the notebook computer according to the present invention can have an excellent heat radiation characteristic compared with the conventional notebook computer.

Meanwhile, a power connector (not shown) is additionally installed parallel with the PCI express connector used for the device bay 300 and thus, a subsidiary battery (not shown) can be inserted into the device bay 300. When an external power source is connected to the main body of the notebook computer, a charge of electricity is given to the upper and lower batteries 350 and 355 mounted in the device bay 300 through the first power connector 340. When the external power source is not connected to the main body, the power connector can perform a discharge operation along with the battery of the main body. Alternatively, the power connector may be connected to the first power connector 340 of a RAM disk located on the other side using a power switch disposed on a mother board and perform a discharge operation along with the upper and lower batteries 350 and 355, so that the power connector can be used to extend a discharge time of the entire battery for the memory card 310.

In some cases, there may be a difference in voltage level between a power supply voltage of a main power battery located on the main body or the top cover 740 and the voltage of the external power source connected to the device bay 300. Thus, a battery switch operation is performed. Specifically, power is initially supplied from the main power battery, and when a voltage level of the main power battery becomes lower than a reference level due to the consumption of the main power battery, the power supply of the main power battery is cut off and the subsidiary battery mounted in the device bay 300 is turned on at the same time. This battery switch operation is performed using a method of monitoring the levels of output voltages of all the batteries mounted in the main body and the device bay 300.

The memory card 310 can be mounted in the device bay 300 according to the present invention. In this case, the memory card 310 may be a RAM disk or a solid state disk (SSD). When an operating system is installed in the RAM disk, the RAM disk can be used as a main disk during a booting operation and perform an on-now function, which can increase the booting speed of the computer.

In the above-described construction, when a memory used for the device bay 300 is not a nonvolatile memory, such as a flash memory device or a phase-change random access memory (PRAM), which retains data even when power is interrupted, but a double data rate (DDR) dynamic RAM (DRAM) memory, continuous supply of power is needed irrespective of the power-off of the notebook computer.

For example, when the RAM disk mounted on the device bay 300, which is in use, is separated from the computer system, the controller 315 detects a state of interruption of external power supply, for example, a shutdown state and a power failure state of the computer system, and a state of separation of the device bay 300 from the computer system. Thus, the RAM disk is automatically switched to a self-refresh mode and receives power from the upper and lower batteries 350 and 355 embedded in the device bay 300. Thereafter, the moment the RAM disk is mounted in the connectors 400 and 450 for the device bay 300 of the main body of the notebook computer, when power is supplied to a power connector (not shown) of the main body, the controller 315 detects the supply of power so that the supply of power of the RAM disk disposed on the device bay 300 is replaced by power input to the notebook computer. Also, when the previous operating mode is the self-refresh mode, the RAM disk escapes from the self-refresh mode so that the upper and lower batteries 350 and 355 of the RAM disk of the device bay perform a charging operation using the input power of the power connector.

Accordingly, even when the notebook computer is turned off, power is supplied through the first power connector 340 from the main battery of the main body of the notebook computer or an additional subsidiary battery (not shown) of the device bay 300.

When the notebook computer is turned off, no power is supplied to the power connector of the device bay 300, and the memory card 310 installed in the device bay 300 is switched to a self-refresh mode, a voltage required to maintain the self-refresh mode of the device bay 300 should be prevented from being applied to the main board of the notebook computer through a power pin of the connector of the main body, which is connected to the device bay 300, and a power pin of the power connector. When the notebook computer is rebooted during the supply of a current to the main board of the notebook computer, since a normal booting operation may be adversely affected, it is necessary to prevent the flow of the current from the memory card 310 of the device bay 300 to the mother board of the main body using a circuit including a power interruption device illustrated in FIG. 11.

FIG. 11 is a circuit diagram showing a circuit including a power interruption device for controlling the power supply of a device bay according to an exemplary embodiment of the present invention, which is applied to a desktop computer.

Referring to FIG. 11, a voltage 820 of 12V is applied from a power source 810 of the computer to a gate G of a power interruption device 815. Also, a voltage 830 of 5V is applied to a source S of the power interruption device 815. A drain D of the power interruption device 815 is connected to a voltage 840 of 5V of a device bay 300. A diode 850 is added to prevent the application of an abnormal overvoltage, and capacitors 870 and 880 function to prevent the occurrence of instantaneous current ripple.

When the supply of power to the desktop computer is interrupted, the voltages 820 and 830 are not applied and the power interruption device 815, which is a field effect transistor (FET), is turned off in response to the voltage input to the gate G. Accordingly, current required for a self-refresh mode of the device bay 300 does not flow between a main board (not shown) and the device bay 300. When a power voltage is supplied to the desktop computer and, hence, the device bay 300, the power interruption device 815 is turned on in response to a voltage applied to the gate G and the power voltage is supplied to the device bay 300. The power interruption device 815 may be an FET or a relay device.

Upon instantaneous power failure, the data stored in the RAM disk can be retained by a subsidiary battery. However, when the power failure lasts for a long time and the battery is discharged to below a reference voltage level, the data is lost.

Since the battery is always charged by a power voltage supplied from an external power adaptor (not shown), the data is normally retained as long as the power failure does not last for a long time.

When a RAM disk is designated as a booting disk and an operating system of the RAM disk suffers a loss due to a continuous power failure, it is clear that booting is not performed on the RAM disk. In this case, the computer performs a normal booting operation with another booting disk, i.e. a hard disk, including its operating system and a file of the operating system backed up from the other booting disk, and then rechecks the existence of the RAM disk.

When the RAM disk turns out to be the booting disk, in order to perform the next booting operation using the RAM disk the RAM disk is formatted and an operation of restoring data stored in a position of the present backup disk toward the RAM disk is automatically performed. In this process, data of the RAM disk in which the operating system is installed is previously backed up in a storage device located in a predetermined position. In this case, the storage device for backup may be the hard disk 140 disposed in the computer or a memory device connected to a USB 180. When the memory device for the USB 180 is used as the storage device for backup, the operating system performs a process of automatically recognizing the connection of the storage device for backup in a plug-and-play manner and secures a physical memory address of the storage device for backup. Therefore, a flash memory device connected to the USB 180 is capable of directly accessing the preset number of the address without using a physical track obtained by a formatting operation, unlike in the conventional hard disk 140. Also, the flash memory device connected to the USB 180 is capable of automatically restoring data of the storage device for backup toward the RAM disk or backing up data of the RAM disk in the storage device for backup on the basis of a start address of the storage device for backup and a start address of the RAM disk corresponding thereto.

FIG. 12 is a flowchart illustrating a booting operation using a RAM disk included in a device bay according to an exemplary embodiment of the present invention.

Referring to FIG. 12, when a computer starts a booting operation (S10), the computer finds the existence of an external apparatus connected to the computer using a plug-and-play function supported by a ROM BIOS 210 and an operating system (S20). As a result, a determination is made as to whether a RAM disk is connected to the computer (S30). When the RAM disk is not connected to the computer, a boot loader area of the RAM disk is read directly to check the operating system to run a boot operation (S30,S70) or a booting operation is performed using a designated disk (S60) and the booting operation ends (S210). When the RAM disk is connected to the computer, a state register is read from the SPD 375 (see FIG. 4) of the corresponding RAM disk (S40) to check if an operating system installation bit is set (S50). When the operating system installation bit is set, which means that a boot loader exists on the corresponding RAM disk, a booting operation is performed on the RAM disk by reading the boot loader (S70). A no-access address is checked from the SPD 375 of the RAM disk (S170), and the booting operation ends (S210). When the operating system installation bit is not set, the booting operation is performed using a designated disk (S80). Subsequently, a determination is made as to whether a test completion bit is set (S90). When the test completion bit is not set, a test is performed on the RAM disk (S100). In this case, at least one address of an error is stored in a specific region of the SPD 375 and the test completion bit is set (S110). Also, an automatic partition and formatting operation is performed on the RAM disk (S120), and a state register is read from a booting disk (S130). However, when the operating system is backed up using an external backup memory device, such as a USB, which is connected to the computer, it is unnecessary to perform a physical formatting operation on the external backup memory device. Instead, data is transmitted to as far as the last physical number of the RAM disk by allowing a physical start address of the RAM disk to correspond to a physical start address of the external backup memory device, so that an additional formatting operation on the external backup memory device can be omitted. Also, when the operating system is restored from the external backup memory device connected to the computer, a restoration operation can be performed without performing an additional formatting operation on the RAM disk in the same manner. Therefore, a process of confirming a state register of the booting disk is performed (S130) without performing the additional formatting operation (S120). A determination is then made as to whether the computer is booted using an operating system backup disk (S140). Thus, when the computer is booted using the operating system backup disk, data of the booting disk in which the operating system is backed up is restored using the RAM disk, and the next address is accessed in restoration operation, with the no-access address avoided (S150). The operating system installation bit is set in the SPD 375 of the RAM disk (S160) and the booting operation ends (S210). When the test completion bit is set in the RAM disk (S90), the state register is read from the booting disk (S130) without performing the physical formatting operation on the RAM disk (S120) in restoring the operating system from the backup memory device connected to the USB. Meanwhile, when the operating system is restored from a hard disk as a backup memory device, an automatic partition and formatting operation is performed on the RAM disk (S120), a state register is checked from the booting disk (S130) to determine whether the computer is booted from the operating system backup disk (S140). Thus, when it is determined that the computer is not booted from the operating system backup disk, a no-access address is read from the SPD 375 of the RAM disk (S180), and it is recognized that the RAM disk is used for general purposes. Also, when it is checked from the state register that the RAM disk is set as a swap memory (S190), a swap file having a designated size is generated (S200) and the booting operation ends (S210).

Meanwhile, in the notebook computer, when a battery voltage reaches a predetermined reference level due to a lasting power failure, the current data of the RAM disk is automatically backed up to a predetermined hard disk or a predetermined external storage device connected to a USB.

FIG. 13 is a flowchart illustrating a backup operation of a RAM disk according to an exemplary embodiment of the present invention.

Referring to FIG. 13, when power is supplied from a battery of a notebook computer to a RAM disk, a backup operation is performed according to the power state of the battery. When the notebook computer is in a shutdown state (S310), the RAM disk determines whether an external power source is cut off (S320). When there is no external power source, the RAM disk receives power from the battery of the notebook computer connected to the RAM disk and can retain data. Thus, when no external power source is connected to the notebook computer, a power state of the battery is read (S330), and a determination is made as to whether the power state of the battery has reached the lowest power level at which the backup operation can be performed (S340). Thus, when the power state of the battery reaches the lowest power level at which the backup operation can be performed, the backup operation starts. In order to minimize the consumption of the battery, an apparatus, for example, a liquid crystal display (LCD), which is not required for the backup operation, is turned off (S350) and the computer is booted (S360). Thereafter, a designated backup position is confirmed (S370), and the data is backed up from the RAM disk to the designated position (S380). Then, an operating system installation bit in the SPD 375 (refer to FIG. 3) is released (S390), the computer and the RAM disk are switched to a shutdown state (S400), and the backup operation ends (S410).

However, when the desktop computer or the notebook computer is turned on, the data of the RAM disk may be backed up periodically and automatically to at least one predetermined hard disk or to a predetermined position of an external storage device connected to a USB.

FIG. 14 is a flowchart illustrating a backup operation of a RAM device according to another exemplary embodiment of the present invention.

Referring to FIG. 14, when a notebook computer is in a boot state (S510), a determination is made as to whether backup conditions are set (S520). When the backup conditions are not set, the backup conditions need to be set and a position where the corresponding data is backed up needs to be designated (S530). Also, an operating system recognizes the designated position and updates a booting order in the ROM BIOS 210 (refer to FIG. 3) (S540). When the computer is booted using a RAM disk, the boot order of the RAM disk, a first backup disk (not shown), a second backup disk (not shown), and a disk having the other operating system is set in the ROM BIOS 210 by the operating system. A determination is made as to whether the preset backup conditions are fulfilled during the operation of the computer (S560), and when the preset backup conditions are fulfilled, data of the RAM disk is backed up to a designated position and a backup completion bit is set (S570). On the backup conditions set by a user, power should be always supplied to the RAM disk even when the backup operation ends. Also, in order to prevent the interruption of power supply during the backup operation and the occurrence of a loss in data, a determination is made as to whether an external power source is cut off (S580), and when the external power source is connected to the computer, a determination is made as to whether the backup operation ends (S550). If the external power source is not connected to the computer, a power state of the battery is checked (S590).

When it is checked if the power state of the battery reaches the lowest power level at which the backup operation can be performed (S600), a determination is made as to whether the backup operation is accepted under the backup conditions (S610). Specifically, a determination is made in (S610) as to whether the user does not set the backup conditions (S530), whether the backup conditions set by the user are not fulfilled (S560), or whether the user wants to back up data of the RAM disk in a final step and sets additional conditions not to accept the backup operation under the backup conditions even when the backup operation is performed (S570). Thereafter, the data is backed up from the RAM disk to a predetermined backup position (S620) to cope with a loss in the operating system. However, when the backup completion bit is set and the backup operation is already performed (570) and the user accepts the backup operation under the set backup conditions (S530), an additional backup operation is not performed. In order to restore the data of the RAM disk in the backup position to the RAM disk in the next booting operation, an operating system installation bit of the SPD 375 is released (S630). Thereafter, the computer is switched to a shutdown state (S640) and the backup operation ends (S650).

In particular, since a desktop computer designates only one position as a backup position, when a power failure occurs during a backup operation, data may not be restored due to incomplete backup. In order to prevent this phenomenon, at least two backup positions need to be designated on a hard disk (S530) in which the user designates the backup position, and every time the backup conditions are fulfilled (S560), a backup operation may be alternately performed to the designated backup positions to provide against the occurrence of a power failure during the backup operation.

As long as the lowest voltage required for a backup is applied to a notebook computer irrespective of whether the notebook computer is turned on or off and an external power source is prepared or not, data stored in the RAM disk can be automatically backed up according to the above-described backup method so that a loss in operating system program and data can be minimized. Therefore, even when power voltage is not supplied due to a power failure, the RAM disk can have a stable operating system and data can be retained, backed up, and restored. As a result, when the notebook computer is employed normally, booting and shutdown operations can be conducted very rapidly and safely using the RAM disk installed in a device bay.

As a matter of convenience, after performing a booting operation using the RAM disk and opening an explorer window, a folder of the RAM disk which is a current booting disk "C:" is automatically opened. In this case, the RAM disk is mainly used to improve booting speed and has a smaller memory size than a hard disk. Thus, after the booting operation, not a region "C:" of the RAM disk but a generally used region "D:" of the hard disk is shown on the explorer window to facilitate user convenience.

A method of increasing the memory size of the RAM disk mounted in the device bay includes a method of increasing the memory size of a memory connected to the SODIMM socket 325 (refer to FIG. 4) located on the memory card 310 (refer to FIG. 4) and a method of connecting an external storage device to the extension connector 330 (refer to FIG. 4) of the device bay 300.

In order to separate the used RAM disk from the main body of the computer and transfer the RAM disk to another place, the controller 315 detects a moment at which the RAM disk is separated from the main body, and the RAM disk refers to the detection of the controller 315 and is switched to a self-refresh mode. Thus, the RAM disk consumes the lowest power and receives power from the upper and lower batteries (refer to FIG. 4), which are subsidiary power sources embedded in the RAM disk.

Like a hard disk in which portions that have given rise to problems in write and read operations are sorted into bad sectors and not substantially used, the RAM disk may be embodied using an errorless memory. However, in order to produce low-priced memories, any memory other than an electrically unusable memory can be used as a device for the RAM disk as long as the address of a portion that is incapable of write and read operations is recognized.

Conventionally, dies other than a memory die that turns out to be a non-defective unit through an electronic die sorting (EDS) process from a wafer having the same CAS latency are discarded using an inking process.

However, according to the present invention, an inking process is performed only on electrically unusable dies that are sorted using an EDS process. Alternatively, an error count is preset, and only dies having an error count greater than the preset error count are sorted into defective units using an inking process, and a packaging process is performed on the remaining dies.

After the packaging process ends, a memory test is performed on the packaged memories. Thus, errorless memories are sorted into normal products, and memories with at least one error on addresses are sorted separately.

In a step of fabricating SODIMM and DIMM modules using the memories and performing an inspection process, data of the addresses where the respective memories have problems is separately written in specific positions of an EEPROM for an SPD disposed on the SODIMM and DIMM modules.

The above-described process may be performed during the fabrication of the SODIMM and DIMM modules. Alternatively, when the memory is initially recognized as a RAM disk, the above-described process may be performed while a computer is conducting a RAM disk self-inspection process.

In any case, when the RAM disk is searched by the computer and a bit located in a specific position of the SPD 375 is found to be untested, the computer performs a test on the RAM disk. The test result is written in the SPD 375 of a specific address region, a tested bit is switched to a set state, and a formatting operation is performed to use the RAM disk normally. However, when a backup operation or a restoration operation is performed on a storage device connected to a USB, the formatting operation may not be performed on the RAM disk.

Before each booting operation is performed or accessing a typical RAM disk for the first time, when a determination is made as to whether the tested bit is in a finished state from the SPD 375 of the RAM disk, a no-access address corresponding to the bad sector is read from the specific address region of the SPD 375 and post-managed when accessing the RAM disk, so that data is not written in or read from the no-access address.

As described above, a memory that is incapable of normal read and write operations can be utilized as a RAM disk so that a low-priced RAM disk can be produced and the entire yield of a memory wafer can increase.

It is possible to integrally form the RAM disk with a main board (not shown) of the main body of the computer instead of the device bay 300 or mount the RAM disk on an inner lateral surface of the top cover of the LCD using the above-described process of testing the RAM disk and recognizing a problematic address. In the latter case, since an area corresponding to the size of an LCD panel can be embodied using the RAM disk, the RAM disk with a large memory size can be integrally formed with the main body.

The device bay 300, which is used for a booting operation, can be switched to a swap memory for improving the processing speed of the computer or a device bay used for general purposes. For example, after the booting operation, when the RAM disk includes no operating system and is not used for the booting operation, the memory size of the system memory 130 of the main body of the computer may be checked and a memory size of the device bay 300, which appears in a specific ratio to the memory size of the system memory 130, can be designated as a swap memory. Also, after executing Windows Explorer, which is an application program provided by Windows that is a kind of operating system, the device bay 300 may be switched to a swap disk or a typical data or program storage. In this case, a position where data of an operating system and data of the device bay 300 are backed up is designated and a use switch button (not shown) is pressed. Then, the data of the device bay 300 is automatically backed up to a predetermined additional disk region or an external storage device connected to a USB. Thereafter, the user is informed that the device bay used for the booting operation is switched to the designated swap disk or the device bay used for general purposes.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A computer system comprising:
    a first storage unit for storing a booting-related program including an operating system program and data, and retaining the stored program and data even when a power voltage is not supplied; and
    a controller for:
    determining whether a second storage unit is connected to the computer system, the second storage unit being an external apparatus and volatile,
    performing a booting operation by executing the booting-related program stored in the first storage unit when the second storage unit is not connected to the computer system,
    determining whether the booting-related program is stored in the second storage unit when the-second storage unit is connected to the computer system,
    performing the booting operation by executing the booting-related program stored in the first storage unit and after performing the booting operation storing the booting-related program stored in the first storage unit in the second storage unit when the booting-related program is not stored in the second storage unit,
    performing the booting operation by executing the booting-related program stored in the second storage unit when the booting-related program is stored in the second storage unit, and
    backing up the booting-related program stored in the second storage unit to the first storage unit when a predefined backup condition is met.

2. The system according to claim 1, wherein the second storage unit comprises a dynamic memory portion to and from which data is written and read.

3. The system according to claim 1, wherein the second storage unit comprises the controller for determining whether a power voltage from a subsidiary power source is to be supplied to the computer system, based on a result of detecting an external power voltage supplied to the computer system.

4. The system according to claim 3, wherein the second storage unit switches an operating mode of a dynamic memory portion to a self-refresh mode directly after the controller detects interruption of external power supply.

5. The system according to claim 1, wherein the second storage unit comprises a subsidiary power source, and the second storage unit allows a dynamic memory portion to escape from a self-refresh mode directly after the controller detects the supply of an external power voltage.

6. The system according to claim 2, further comprising
    a device bay;
    an integrated device electronics (IDE) connector connected to an IDE bus;
    a serial advanced technology attachment (SATA) connector connected to a SATA bus; and
    a peripheral component interconnection (PCI) connector or PCI express connector connected to a PCI bus or a PCI express bus,
    wherein the external device unit is connected to the IDE connector when a CD ROM drive is mounted on the device bay, connected to the SATA connector when a hard disk is mounted on the device bay, and connected to the PCI connector or PCI express connector when an external storage means is mounted on the device bay, to transmit data.

7. The system according to claim 2, wherein the controller performs a test on all addresses of the dynamic memory portion before the booting-related program stored in the first storage unit is stored in the second storage unit, and stores at least one defective address of the dynamic memory portion in a specific region of the second storage unit when the at least one defective address of the dynamic memory portion is detected, and
    wherein the booting-related program stored in the first storage unit is stored in the remaining addresses of the second storage unit except the at least one defective address stored in the specific region of the dynamic memory portion.

8. The system according to claim 7, wherein the controller sets an operating system installation bit in a specific region of the second storage unit.

9. The system according to claim 7, wherein when the booting-related program is stored in the second storage unit, the controller sets a read-only memory (ROM) basic input/output system (BIOS) to perform the booting operation using the booting-related program stored in the second storage unit.

10. The system according to claim 7, wherein when the booting-relating program is stored in the second storage unit, the controller changes the setting of the ROM BIOS so that the booting operation is performed using the booting-related program stored in the first storage unit or the booting-related program stored in the second storage unit.

11. The system according to claim 7, wherein the controller performs a formatting operation on the dynamic memory portion of the second storage unit.

12. The system according to claim 7, wherein when the second storage unit is detected and a booting-related program storage, bit of the specific region of the second storage unit is released, the controller judges that the booting- related program is not stored in the second storage unit.

13. The system according to claim 1, further comprising:
a power source unit for receiving power from an external power source to supply the power; and
a battery for applying a battery voltage to the power source unit,
wherein when the external power source is cut off and the battery voltage reaches a reference voltage level, the booting operation is performed using the booting-related program stored in the second storage unit and the booting-related program stored in the second storage unit is backed up to the first storage unit.

14. The system according to claim 13, wherein the controller releases the operating system installation bit set in the specific region of the second storage unit.

15. The system according to claim 13, wherein when backup conditions are set, the controller backs up the booting-related program stored in the second storage unit to the first storage unit under the backup conditions.

16. The system according to claim 1, further comprising a memory portion located in a backup position,
wherein a formatting operation is not performed on the memory portion located in the backup position designated by the backup conditions during a backup operation.

17. The system according to claim 15, wherein the controller releases the operating system installation bit set in the specific region of the second storage unit.

18. The system according to claim 15, wherein when the first storage unit is divided into a predetermined number of regions, a backup position corresponding to the backup conditions is set using a ROM BIOS.

19. The system according to claim 1, which is a portable computer,
wherein the portable computer comprises a flat panel display (FPD),
wherein a battery of the portable computer comprises: a fuel cell; a fuel storage for supplying fuel to the fuel cell; and a by-product storage for storing a liquid byproduct generated by the fuel cell, and
wherein the fuel storage and the byproduct storage are located on a rear surface of the FPD.

20. The system according to claim 19, wherein a dynamic memory used for the second storage unit is mounted on the rear surface of the FPD.

21. The system according to claim 19, wherein heat generated by the computer system is cooled down using a cover of the rear surface of the FPD as a heat sink.

22. The system according to claim 1, which is a portable computer,
wherein the portable computer comprises an FPD,
wherein a battery of the portable computer is a paper cell, a lithium cell, or a lithium polymer cell, and
wherein the battery is located on a rear surface of the FPD.

23. The system according to claim 22, wherein the battery is separated from the rear surface of the FPD, and a fuel storage for supplying fuel to a fuel cell is located on the rear surface of the FPD.

24. A method of booting a computer system comprising a first storage unit for storing a booting-related program including an operating system program and data, and retaining the stored program and data even when a power voltage is not supplied, the method comprising:
determining whether a second storage unit is connected to the computer system, the second storage unit being an external apparatus and volatile;
performing a booting operation by executing the booting-related program stored in the first storage unit when the second storage unit is not connected to the computer system;
determining whether the booting-related program is stored in the second storage unit when the second storage unit is connected to the computer system;
performing the booting operation by executing the booting-related program stored in the first storage unit and after performing the booting operation storing the booting-related program stored in the first storage unit in the second storage unit when the booting-related program is not stored in the second storage unit;
performing the booting operation by executing the booting-related program stored in the second storage unit when the booting-related program is stored in the second storage unit; and
backing up the booting-related program stored in the second storage unit to the first storage unit when a predefined backup condition is met.

25. The method according to claim 24, wherein the performing the booting operation and after performing the booting operation storing the booting-related program stored in the first storage unit in the second storage unit comprises:
performing a test on all addresses of a dynamic memory portion of the second storage unit before the booting-related program stored in the first storage unit is stored in the second storage unit and storing at least one defective address of the dynamic memory portion in a specific region of the second storage unit when the at least one defective address of the dynamic memory portion is detected; and
storing the booting-related program stored in the first storage unit in the remaining addresses of the second storage unit except the at least one defective address stored in the specific region of the dynamic memory portion.

26. The method according to claim 25, further comprising setting an operating system installation bit in the specific region of the second storage unit.

27. The method according to claim 26, wherein when the computer system detects the interruption of external power supply, the second storage unit switches an operating mode of the dynamic memory portion to a self-refresh mode.

28. The method according to claim 26, wherein when it is detected that an external power voltage is supplied to the computer system, the second storage unit allows the dynamic memory portion to escape from a self-refresh mode.

29. The method according to claim 26, further comprising performing a formatting operation on the dynamic memory portion of the second storage unit.

30. The method according to claim 26, wherein when a backup or restoration operation is performed on the first storage unit, a formatting operation is not performed on the dynamic memory portion of the second storage unit.

31. The method according to claim 27, wherein the setting an operating system installation bit in the specific region of the second storage unit comprises setting a ROM BIOS to perform the booting operation using the booting-related program stored in the second storage unit when the booting-related program is stored in the second storage unit.

32. The method according to claim 26, wherein the determining whether the booting-related program is stored in the second storage unit when the second storage unit is connected to the computer system comprises judging that the booting-related program is not stored in the second storage unit when a booting-related program storage bit of the specific region of the second storage unit is released.

33. The method according to claim 24, wherein the backing up the booting-related program stored in the second storage unit to the first storage unit when a predefined backup condition is met further comprises:
   performing the booting operation using the booting-related program stored in the second storage unit when the external power source is cut off and the battery voltage reaches the reference voltage level; and
   backing up the booting-related program stored in the second storage unit to the first storage unit and releasing the operating system installation bit set in the specific region of the second storage unit.

34. The method according to claim 32, wherein the backing up the booting-related program stored in the second storage unit to the first storage unit when a predefined backup condition is met further comprises backing up the booting-related program stored in the second storage unit to the first storage unit under the backup conditions and releasing the operating system installation bit set in the specific region of the second storage unit when backup conditions are set.

35. The method according to claim 24, wherein in the performing the booting operation by executing the booting-related program stored in the second storage unit when the booting-related program is stored in the second storage unit, after performing the booting operation using the booting-related program stored in the second storage unit, the second storage unit is designated as a swap memory disk or a typical memory disk.

36. The method according to claim 35, wherein after designating the second storage unit as the swap memory disk or the typical memory disk, data stored in the second storage unit is backed up to a designated position.

* * * * *